May 16, 1944.　　　F. A. GAUGER ET AL.　　　2,348,969
MODULATING CONTROL SYSTEMS
Filed Aug. 5, 1939　　　4 Sheets-Sheet 1

INVENTORS
FRANK A. GAUGER
EDWIN A. JONES
BY
Arthur R. Woolfolk
ATTORNEY.

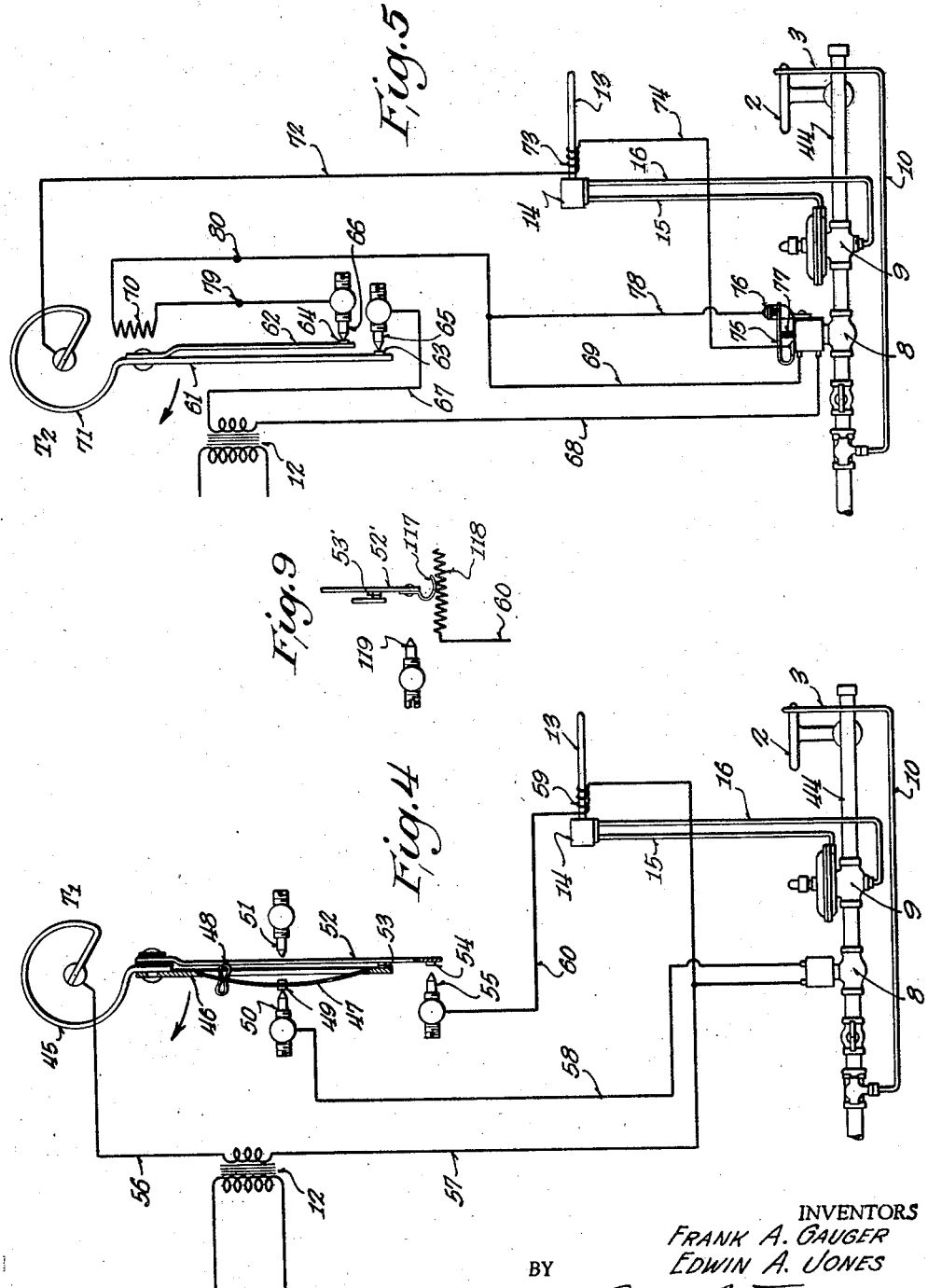

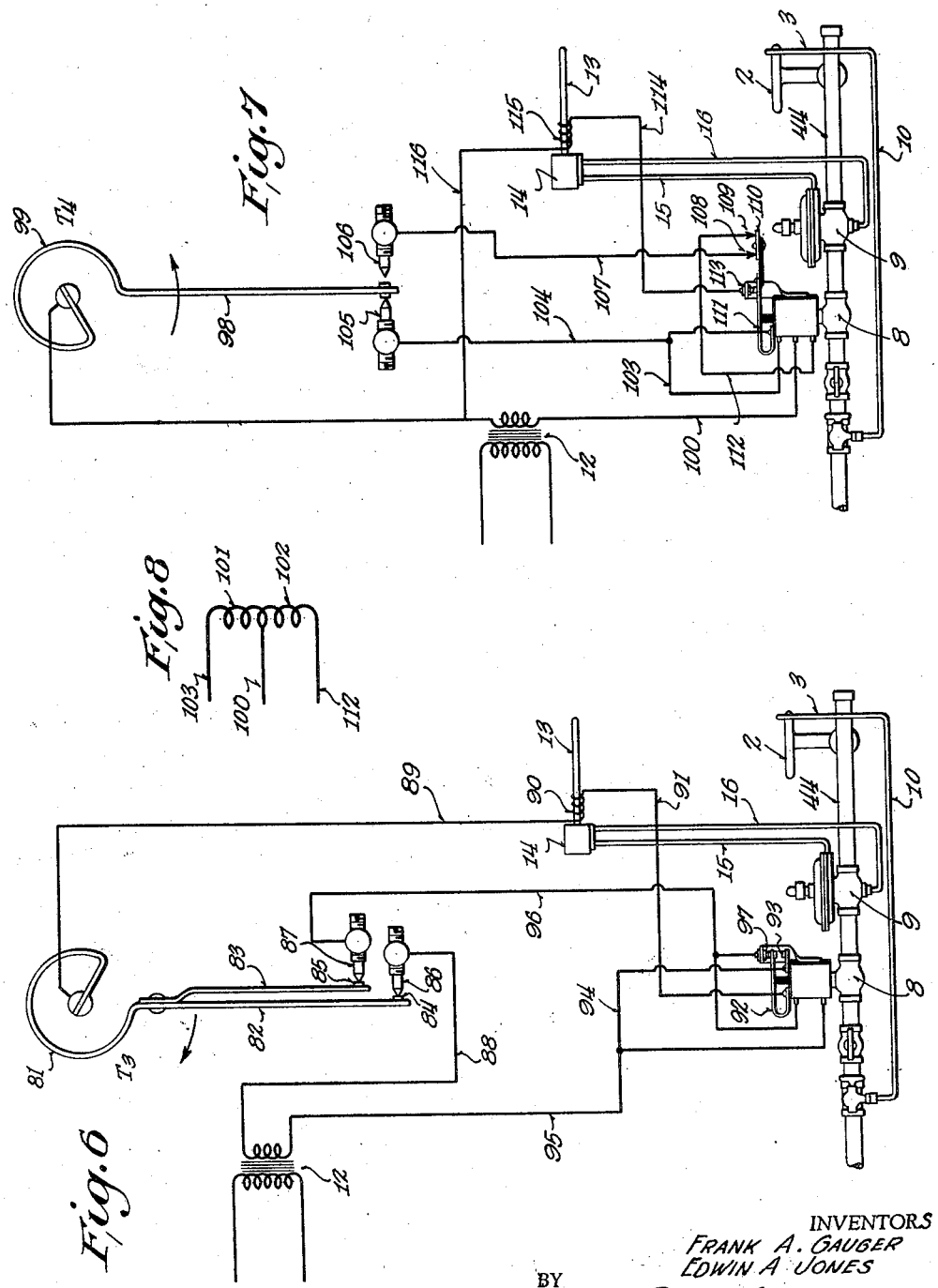

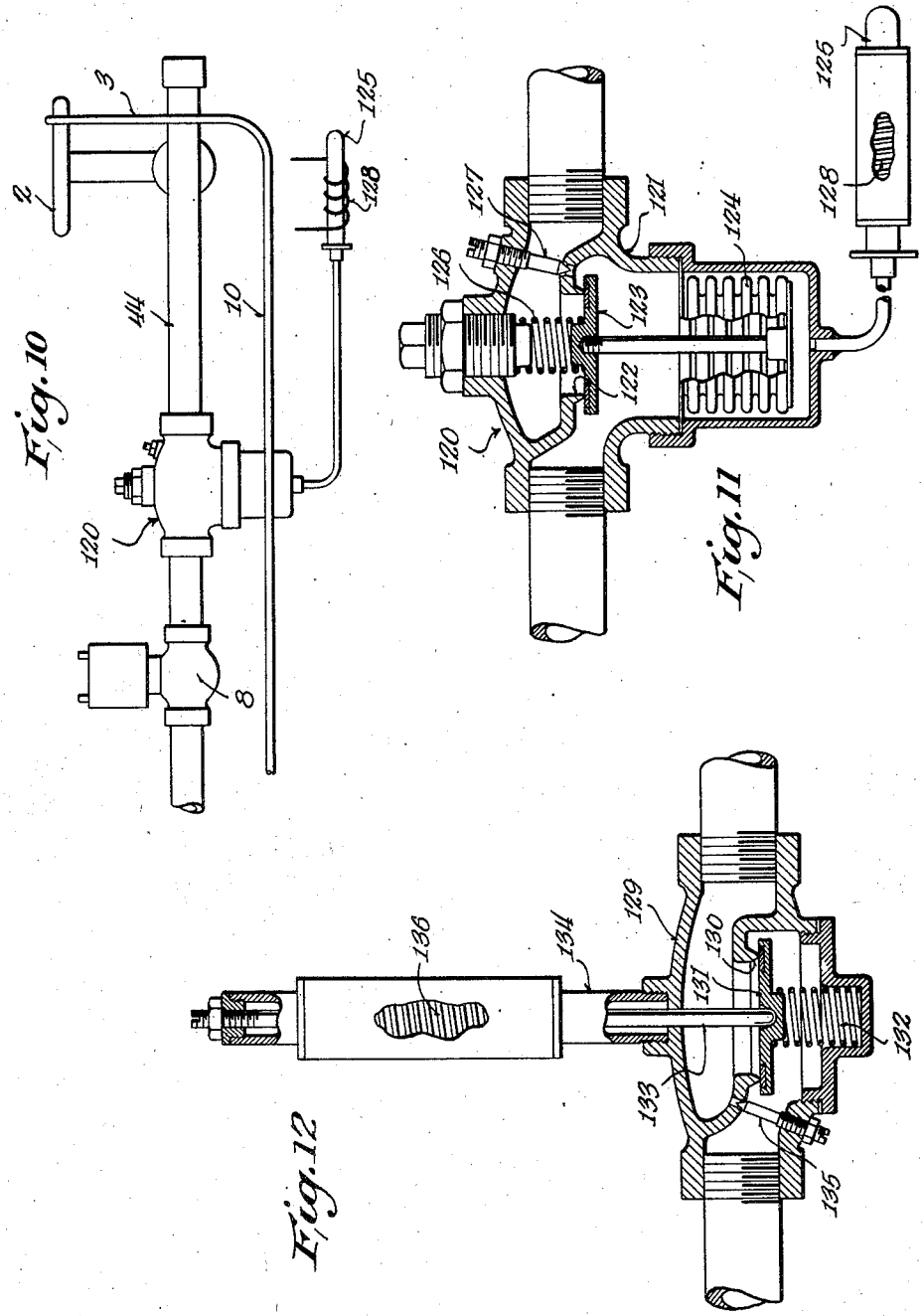

Patented May 16, 1944

2,348,969

UNITED STATES PATENT OFFICE 2,348,969

MODULATING CONTROL SYSTEM

Frank A. Gauger, Milwaukee, and Edwin A. Jones, Shorewood, Wis.; said Gauger, assignor to Minneapolis-Honeywell Regulator Company, Minneapolis, Minn., a corporation of Delaware Application August 5, 1939, Serial No. 283,528

5 Claims. (Cl. 236—68)

The present invention relates to heating systems.

An object of the invention is to provide a modulating control system for heating in which a room thermostat is employed which in the preferred form has make and break contacts, and yet secures accurate modulation or modulated high low control of the fuel supply and maintains the temperature control within very close limits.

Another object is to provide a modulating control system which works accurately between maximum and minimum temperatures, in which all modulation occurs in a zone between these maximum and minimum temperatures, and in which the maximum and minimum temperatures may be so close that the change from one to the other is not perceptible by a person's body.

Another object is to provide a modulating control system in which the flame of the burner comes on and stays on but is modulated to meet the present demand or any variation in the demand, the flame, however, being gradually reduced as the temperature approaches maximum, the temperature being under control at all times so that there is no possibility of wide variations in temperature.

Another object is to provide a heating system in which a modulating valve is controlled by a throttling thermostat, in which the throttling thermostat has additional heat added thereto which additional heat is controlled by an on and off simple type of thermostat in the preferred form, and in which the same thermostat also controls an on and off valve.

Another object is to provide a modulated heating system in which, in the preferred form, the fuel flow is modulated by a pressure regulator functioning as a modulator under an artificial pressure built up and controlled by a throttling thermostat which is itself controlled by a simple type of on and off thermostat.

Another object is to provide a modulating system in which though the main or room thermostat makes and breaks its contacts repeatedly, or, if of the variable resistance type, varies its adjustment repeatedly, nevertheless the main or on and off valve opens only once and thereafter the fuel flow is controlled by a modulating valve which does not open and close but which modulates in accordance with the demand, and which though the room thermostat makes and breaks contact, nevertheless secures a graduated control or modulating control for the fuel flow so that there is no abrupt turning on and turning off of the fuel to secure the modulation, but instead in which the fuel flow is gradually checked or increased in accordance with the demand.

Another object is to provide a modulating system of control in which a simple type of modulating valve of the order of a pressure regulator is employed, in the preferred form, and is caused to modulate under the control of an artificial pressure, such control by the artificial pressure being obtained by a throttling thermostat that has sufficient mass in proportion to its heat losses that an averaging effect is produced, so that although the room thermostat or master control comes on and off repeatedly, nevertheless the adjustment of the modulating valve is gradual.

Other objects are to provide a very simple modulating control system which employs easily produced relatively cheap parts and which is easy to adjust and install.

Referring to the drawings more particularly by reference numerals:

Fig. 4 is a diagrammatic view showing one modification of the present invention;

Figs. 5, 6 and 7 are diagrammatic views showing other modifications of the present invention;

Fig. 8 is a diagrammatic detail of the coils in the magnetic valve of Fig. 7;

Fig. 9 is a fragmentary view of a further form of thermostat;

Fig. 10 is a fragmentary view of a modified modulating valve;

Fig. 11 is a sectional detail through the modulating valve of Fig. 10; and

Fig. 12 is a fragmentary view of a further form of modulating valve.

Figure 1:
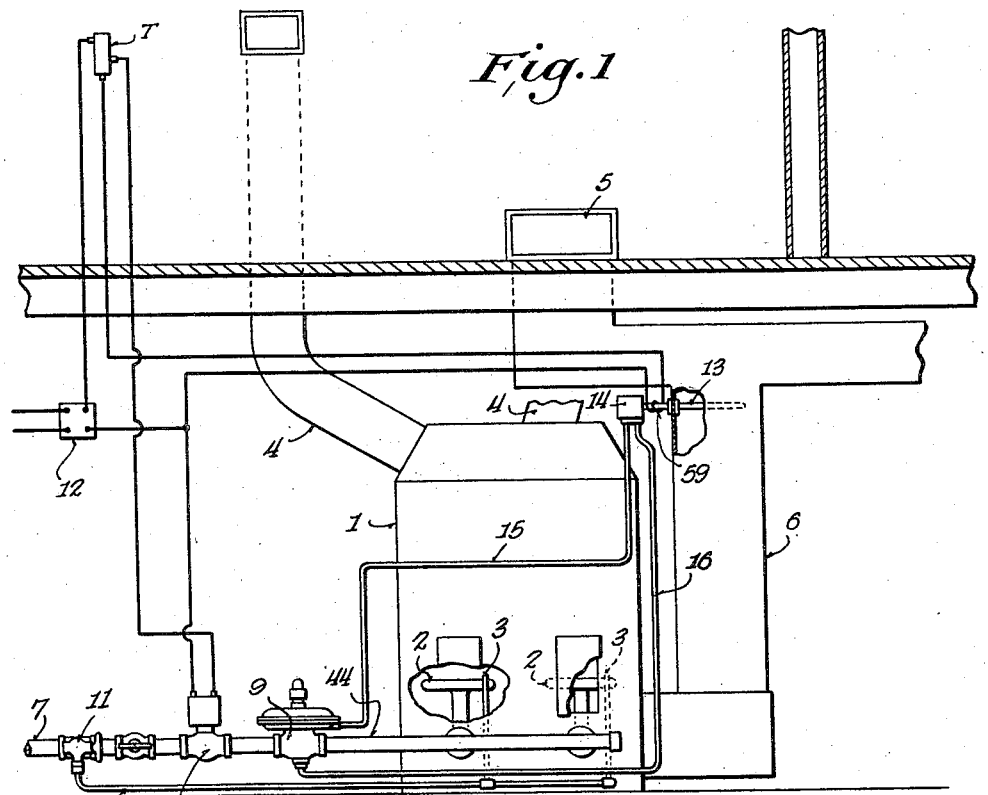
Fig. 1 is a diagrammatic view showing in general a heating system.

Referring to Fig. 1 of the drawings, I indicates generally a gas furnace which includes burners 2 and pilot lights 3. Hot air delivery pipes 4 leading to spaces to be heated are connected to the furnace I. A single cold air return 5 is shown leading to a main cold air return 6 which opens into the heating chamber of the furnace I.

A gas main 7 is connected to the burners 2. An electro-magnetic main on and off valve 8 and a combined pressure regulator and modulating valve 9 are disposed in the gas main 7. A pilot supply line 10 extends from a point in the main 7 in advance of the on and off valve 8 to the pilot lights 3, an adjustment valve 11 being provided at the tap with the main 7.

The valve 8 is connected by suitable leads to a room thermostat T for control thereby, electrical energy being supplied through a step-down transformer 12. The pressure regulating and modulating valve 9 is controlled in its modulating function by a gas thermostat 13 which includes a throttling gas valve 14 controlling a bleed line 15 leading from the valve 9 thereto, the bleed line 15 continuing as line 16 from the thermostat 13 to the discharge side of the valve 9. In Fig. 1, the gas thermostat 13 is shown positioned in the return duct 6; in Fig. 2, the gas thermostat is shown as part of the modulating valve 9, the thermostat being indicated by 19 and the valve by 20; and in Fig. 3, the gas thermostat is shown within the bonnet of the furnace 1, the thermostat being indicated by 17 and the valve by 18.

The pressure regulating and modulating valve 9 (Fig. 2) includes an inlet chamber 21, an outlet chamber 22, a valve seat 23, and a valve 24 having a shank screw-threaded into a small head 25 secured to the under face of a diaphragm 26. A small freely flexible diaphragm 27 is clamped between a lower casing portion 28 and the main casing of the valve 9. Centrally the diaphragm 27 is clamped between a shoulder of the shank of the valve 24 and the lower portion of the head 25. The diaphragm 26 is clamped between the lower casing portion 28 and an upper casing portion 29, thereby providing a lower diaphragm chamber 30 and an upper diaphragm chamber 31. The upper chamber 31 is freely vented to the air at 32.

The upper casing portion 29 includes an integral upwardly extending neck 33 which is both externally and internally threaded. An adjusting screw 34 threadedly engages the internal threads of the neck 33 and bears against a compression spring 35, the lower end of the spring 35 being seated around the head of a screw 36 which secures a large rigid disk 34 against the upper surface of the diaphragm 26 and which is in threaded engagement with the head 25. A lock nut 38 secures the screw 34 in its adjusted position. A cover cap 39 threadedly engages the external threads of the neck 33 to conceal and protect the adjusting screw 34. A bleed line 15' (15 in Fig. 1) taps the lower chamber 30 and leads to the valve 20. A line 16' leads from the valve 20 to the outlet chamber 22 of the valve 9.

A minimum flow by-pass duct 40 communicates the inlet chamber 21 and the outlet chamber 22. An adjustable needle valve 41 controls the flow cross-section of the duct 40. A small duct 42 leads from the inlet chamber 21 into the lower chamber 30, an adjustable needle valve 43 being provided to vary the flow cross-section of the duct 42. The maximum cross-section of the duct 42 is a small fraction of the maximum cross-section of the bleed line 15'.

Referring to Fig. 4, there is disclosed a thermostat T1 which includes a bimetallic strip or portion 45 supporting an arm 46. The arm 46 is cut away in its central portion and is provided with notches receiving a snap spring strip 47 to which is secured reverse bows 48. (For further details see Gauger Patent No. 1,954,446 granted April 10, 1934.) A contact 59 is secured to the spring strip 47 intermediate its ends which in one position engages a stationary contact 50 mounted to the left thereon, and in the opposite position, a stationary contact 51 mounted to the right thereof. A spring strip 52 is secured to the arm 46 in insulated relationship thereto. The spring strip 52 and the arm 46 are provided with opposing contacts 53 which are normally in engagement. The arm 52 is also provided with a contact 54 which is in opposed relationship to a stationary contact 55. A conductor 56 connects one side of the secondary of the step-down transformer 12 with the bimetallic strip 45. A conductor 57 connects the other side of the secondary with one terminal of the winding of the electro-magnetic valve 8. The other terminal of the said winding is connected by a conductor 58 with the stationary contact 50. The conductor 57 is also connected to one side of a small heat coil or resistance 59 wound on the thermostat 13. The other side of the heat winding 59 is conected by a conductor 60 with the stationary contact 55.

Referring to the modification shown in Fig. 5, there is disclosed a room thermostat T2 which includes a spring arm 61 carrying a second spring arm 62. The arms 61 and 62 have contacts 63 and 64, respectively, at the free ends thereof which cooperate with stationary contacts 65 and 66, respectively, mounted in opposed relation thereto. A conductor 67 connects one side of the secondary of the transformer 12 to the stationary contact 65, the other side of said secondary being connected by a conductor 68 to one terminal of the winding of the electromagnetic on and off valve 8. A conductor 69 connects the other terminal of the said winding to one terminal 80 of an anticipating heat coil 70, the other terminal 79 of the coil 70 being connected by a conductor to the stationary contact 66. A conductor 72 connects a bimetallic portion 71 of the thermostat T2 with one side of a heat coil 73 surrounding the gas thermostat 13. A conductor 74 connects the other side of said coil 73 to a movable spring contact strip 75 biased from and normally out of engagement with a stationary contact 76 mounted on the valve 8 as a support. The valve 8 is provided with a projecting rod or plunger 77 of insulating material which engages the strip 75 and which maintains the strip 75 in engagement with the contact 76 when the valve 8 is open. A conductor 78 connects the stationary contact 76 to the conductor 69.

Referring to Fig. 6, there is shown a thermostat T3 which includes a bimetallic portion 81 having an integral spring arm 82 to which is secured a second spring arm 83. The spring arms 82 and 83 have contacts 84 and 85, respectively, at the free ends thereof which cooperate with stationary contact 86 and 87, respectively, mounted in opposed relation thereto. A conductor 88 connects the secondary of the step-down transformer 12 to the stationary contact 86. A conductor 89 connects the bimetallic portion 81 to one side of a heating coil 90 wound on the gas thermostat 13. A conductor 91 connects the other side of the coil 90 to a spring contact arm 92 mounted on the electromagnetic valve 8. The free end of the contact arm 92 is provided with a contact on each face, said arm 92 being biased to normally maintain the lower contact in engagement with a lower stationary contact 93 which is connected by conductors 94 and 95 to the other side of the secondary of the transformer 12. One terminal of the winding of the electro-magnetic valve 8 is connected to the conductor 95, and, hence, to the said other side of the secondary of the transformer 12. The other side of the winding of the valve 8 is connected by conductor 96 to the stationary contact 87, and to an upper stationary contact 97 supported on the valve 8 and disposed in cooperative opposed relation to the upper contact carried by the contact arm 92.

Referring to Fig. 7, there is disclosed a room thermostat T4 including a bimetallic portion 99 carrying a single arm 98. The bimetallic portion 99 is connected to one side of the secondary of the step-down transformer 12. A conductor 100 connects the other terminal of the said secondary to the center terminal of a double winding of the electro-magnetic valve 8 (Fig. 8). The double winding includes one winding 101 which is normally the operating winding to open the valve 8, and a second winding 102 bucking the winding 101 which neutralizes the effect of the winding 101 when both windings are energized to permit the valve 8 to close. The upper winding 101 is connected by conductors 103 and 104 to a stationary contact 105 disposed at one side of the spring arm 98. At the other side of the free end of the spring arm 98 is a stationary contact 106 connected by a conductor 107 to a stationary contact 108 mounted on the valve 8. A second stationary contact 109 is located adjacent the stationary contact 108. A movable conductive element 110, insulatively supported from a conducting spring strip 111, bridges the stationary contact 108 and 109 when the strip 111 is in its uppermost position. The spring strip 111 is mounted on the valve 8 and includes a contact on its upper face in opposed relation to a stationary contact 113 mounted on the valve 8, said contact on the strip 111 and the conductive element 110 being normally out of engagement with the stationary contact 113 and the stationary contacts 108 and 109, respectively. A conductor 112 connects the contact 109 with the lower terminal of the bucking coil 102. A conductor 114 connects the stationary contact 113 to one side of a heating coil 115 surrounding the gas thermostat 113, the other side of the heating coil 115 being connected by a conductor 116 to the upper terminal of the said secondary of the transformer 12.

In Fig. 9 there is shown part of a variable resistance thermostat including an arm 52' provided with a wiping contact 117 in engagement with a resistance 118, one end of the resistance being connected to the conductor 60. A stop 119 limits the movement to the left of the arm 52'. The remaining elements of the system are of the exact form of Fig. 4.

Referring to Figs. 10 and 11, there is disclosed a modified modulating valve, generally indicated 120, which is of the Sylphon type. The valve 120 includes a casing 121 having therein a valve seat 122 with which cooperates a valve 123 moved by Sylphon bellows 124 which are actuated from the bulb 125. An adjustable spring 126 biases the valve 123 towards open position. A minimum flame by-pass 127 communicating the inlet and outlet of the casing 121 is provided. A heating coil 128 is disposed about the control bulb 125 which corresponds to the heating coil about the gas thermostat 13 in the above described systems.

In Fig. 12 is shown still another modified modulating valve which includes a casing 129 having therein a valve seat 130 with which cooperates a valve 131 spring-urged by a spring 132 into engagement therewith. A non-expansible rod 133 is in engagement with the valve 131, the upper end of the rod 133 being attached to the upper end of a copper or other expansible tube 134 secured to the casing 129. A heating coil 136 is wound around the tube 134 in the manner of the heating coils about the gas thermostat 13 in the above described systems. A minimum flame adjustable by-pass valve 135 communicates the inlet and outlet of the casing 129.

Operation

The particular operation of the pressure regulating and modulating valve 9 (Fig. 2) is set forth in our co-pending application, Serial No. 243,944 filed December 5, 1938. It is sufficient for the present invention to point out that the valve 9 operates as a pressure regulator until the restriction of the bleed line 15, 16 by the gas valve 14 when under operation of the thermostat 13 reduces the flow section thereof to less than the flow section of the duct 42, whereupon the valve 9 functions as a modulating valve, an artificial pressure being established in the chamber 30 in excess of burner pressure. Were the line 16 exhausted to atmosphere and not into the outlet chamber 22 of the valve 9, the valve 9 would operate solely as a modulating valve.

Particularly considering the operation of the system shown in Fig. 4, with the thermostat in the position there shown the circuit through the electro-magnetic valve 8 is closed, and, hence, the valve 8 is open so that gas passes therethrough to and through the modulating valve 9 to the burners 2. The adjustable spring 35 of the valve 9 (Fig. 2) is, of course, preadjusted to the desired maximum pressure to which gas will be supplied the burners 2. Assuming that the valve 14 is fully open, gas passes through the bleed duct 42 into the lower chamber 30 and thence freely passes through the lines 15, the open valve 14, and the lines 16 to the outlet chamber 22. Hence, the diaphragm 26 is subjected to burner pressure since, as pointed out above, the cross-section of the lines 15 and 16 is many times greater than the cross-section of the bleed duct 42. However, as heat is applied to the thermostat 13 from the coil 59, the valve 14 throttles toward closed position until the cross-section of the lines 15, 16 is less than that of the bleed duct 42 to build up an artificial pressure in the chamber 30 and to throw the control of the position of the diaphragm 26 to the valve 14 and thermostat 13. The valve 24 will then float or modulate in accordance with the temperature of the thermostat 13.

If a room being heated is cold and demands heat, the valve 9 will remain fully open until after the temperature of the room begins to rise. As the temperature of the space reaches a predetermined point, the movable contact 54 will engage the stationary contact 55 through movement of the bimetallic portion 45 of the thermostat T1 to close the circuit through the heating coil 59 disposed about the thermostat 13, a circuit in parallel with that through the coil of the valve 8. The artificial heat supplied the thermostat 13 by the coil 59 causes a throttling of the valve 14 and a consequent modulation action of the valve 9 to decrease the supply of gas to the burner 2. As the valve 9 throttles, there is a slight decrease in temperature in the space heated resulting in the opening of contacts 54 and 55 due to reverse movement of the bimetallic portion 45 thus opening the circuit of the heating coil 59. The thermostat 13 thereupon cools slightly to open the valve 14 and in ratio therewith the valve 9. The foregoing cycle is repeated, maintaining the temperature of the room at the desired level, and employing a continuous modulated flame at the burners 2.

Should the temperature of the space heated approach very close to the break temperature of the contact 49, the contacts 54 and 55 will remain in engagement so that artificial heat is continued to be supplied the thermostat 13 by the coil 59 which effects closing of the valve 9. Minimum flame then obtains by gas supplied through the duct 40. Should heat supplied by the minimum flame be more than required, the arm 46 of the thermostat T1 will continue its movement to the left to snap the bow strip 45 over center from the stationary contact 50 into engagement with the stationary contact 51, opening the circuit of the electromagnetic valve 8 which immediately closes, cutting off all gas supply to the burners 2. The on and off valve 8 functions at two spaced temperatures only a few degrees apart, and, preferably, subtending a range not noticeable by a human body. Modulation occurs between the two extreme temperatures, starting slightly above the lowest temperature and terminating to give away to minimum flame just below maximum temperature. Due to the maximum rate of thermal radiation of the thermostat 13, no sudden violent jumping or moving of the valve 9 occurs, there being instead a floating action. The thermostat 13, of course, also responds to the temperature of the air in the cold air return or to the temperature in the bonnet of the furnace when disposed in these places, but is adjusted in accordance therewith.

It is manifest, therefore, that modulation is secured by the system shown in Fig. 4, even though a simple type of make and break thermostat T1 is employed.

The auxiliary contacts 53 of the thermostat T1 comprise means for breaking the circuit of the heating coil 59 during any time that the temperature of the space heated remains past a certain predetermined point. In summer weather, the arm 46 will be to the left with the bow spring 47 permanently in contact with the contact 51. Continued movement of the arm 46 to the left due to the warm weather will open the contacts 53 and break the circuit of the heating coil 59. Hence, in summertime, both the circuit of the valve 8 and the heating coil 59, remain open.

Particularly considering the operation of the system shown in Fig. 5, the thermostat T2, as the thermostat 71 moves counterclockwise when cooling and clockwise when subjected to heat. The relationship of the movable contacts 63 and 64 and the stationary contacts 65 and 66, respectively, is such that in movement counterclockwise, the movable contact 63 first engages the contact 65, the movable contact 64 engaging the contact 66 upon further movement of the thermostat T2. Obviously, in clockwise movement, the movable contact 64 breaks with contact 66 first.

Assuming that there is a call for heat due to cooling of a room being heated, the movable contact 63 closes with the contact 65, but no electrical circuit is established, for the contacts 64 and 66 are still separated as are the strip 75 and the contact 76. Continued movement of the thermostat T2 closes the movable contact 64 with the contact 66 establishing the circuit through the electro-magnetic valve 8 to immediately open the same, and through the heating coil 70. As before described, the valve 9 is in fully open position, and, hence, a full flow of gas to the burners 2 obtains. The temperature of the room begins to rise slightly, whereupon the thermostat T2 moves clockwise disengaging the contact 64 from the contact 66, an action hastened artificially by the heat coil 70. A holding circuit including the bimetallic portion 71, the conductor 72, the heater coil 73, the conductor 74, the contact strip 75, the stationary contact 76, the conductors 78 and 69, the coil of the electro-magnetic valve 8, the conductor 68, the secondary of the transformer 12, the conductor 67, the stationary contact 65, the movable contact 63, and the spring arm 61 maintains the electro-magnetic valve 8 in open position.

However, the coil 73 supplies artificial heat to the thermostat 13 which effects throttling of the valve 14 and therethrough the valve 9. Should the temperature continue to rise, the throttling will be complete to the degree of minimum flame as above described in connection with Fig. 4. Should the temperature of the room drop but slightly, the thermostat T2 will move counterclockwise reengaging movable contact 64 with contact 66, shorting-out the coil 73, and permitting cooling of the thermostat 13 with resulting opening to a greater degree of the valve 9 which permits more gas to reach the burners 2. The aforesaid cycle is repeated, maintaining the predetermined temperature for the room. Should conditions raise the room temperature beyond that at which the contact 63 opens, then contact 63 is moved out of engagement with the contact 65, interrupting the whole electrical circuit to close the electromagnetic valve 8.

It is to be observed that the heating coil 70 functions only on the cold setting of the space thermostat T2, during a relatively high flame setting of the valve and is an anticipating heater. A desirable feature of heat anticipation on the cold setting of the thermostat is the prevention of excess heat storage in a furnace which would override the predetermined room temperature setting and the thermostat contact break-setting regardless of subsequent reduction of flame. The heating coil 70 will not be energized unless the thermostat T2 is in its cold position and is endeavoring to secure higher flame operation.

Particularly considering the operation of the system shown in Fig. 6, the operation of the thermostat T3 is the same as the thermostat T2 shown in Fig. 5 and above described. Assuming a fall in temperature in a room being heated, counterclockwise movement of the thermostat T3 first engages movable contact 84 with stationary contact 86 which immediately completes the circuit through the heating coil 90 surrounding the gas thermostat 13, artificially supplying heat thereto and causing closing or throttling of the valve 14. The valve 9 remains fully open inasmuch as the valve 8 is closed and no gas is flowing. However, further counterclockwise movement of the thermostat T3 effects engagement of the movable contact 85 with the stationary contact 87, energizing the coil of the electromagnetic valve 8 causing the valve 8 to open. A full supply of gas passes to the burners 2, but immediately thereafter throttling or modulation of the valve 9 occurs as a result of the previously assumed position of the valve 14. Movement of the valve 8 to open position effects closing of the contact arm 92 with the stationary contact 97 which short circuits the heater coil 90 which permits cooling of the thermostat 13 and subsequent opening of the valves 14 and 9 permitting more gas to pass to the burners 2. Thereupon, the temperature in the room arises causing clockwise movement of the thermostat T3 and breaking of the contacts 85 and 87. The latter action permits renewal of the circuit through the heater coil 90 with resulting artificial heating of the thermostat 13. The foregoing cycle is repeated, maintaining the predetermined room temperature. Should the room warm beyond the high break temperature of the thermostat T3, the clockwise movement of the thermostat T3 breaks engagement between the contacts 84 and 86 to deenergize the whole circuit, thereby closing the valve 8. The valve 8 is maintained in open position during the modulation cycles by the holding circuit which is effective when the contact 85 is out of engagement with the contact 87 although contacts 84 and 86 are engaged.

Particularly considering the operation of the system shown in Fig. 7, the thermostat T4 is of the single arm type. As mounted, a drop in temperature effects clockwise movement and the application of heat causes counterclockwise movement of the thermostat T4. Assuming a drop in temperature in a room being heated, the thermostat T4 will move clockwise engaging one contact with the contact 105 establishing a circuit through the upper coil of the electric-magnetic valve 8, opening the valve 8 and permitting a full flow of gas to the burners 2. The opening of the valve 8 effects movement of the strip 111 into engagement with the stationary contact 113 and the conductive element 110 into bridging engagement with the stationary contacts 108 and 109. Upon the resultant temperature rise in the room, the thermostat T4 moves counterclockwise breaking the aforesaid contact between the arm 98 and the stationary contact 105. However, the valve 8 remains open due to the establishment of a holding circuit from the upper side of the transformer 12 through the conductor 116, the heater coil 115, the conductor 114, the stationary contact 113, the contact strip 111, the conductor 103, the upper terminal of the upper coil 101 of the electro-magnetic valve 8, and the conductor 100. Due to the action of the gas thermostat 13 under effect of the heater coil 115, the valve 14 and the valve 9 throttle to modulate the fuel flow to the burners 2. Failing the attainment of maximum temperature, the thermostat T4 moves clockwise to engage the stationary contact 105 thereby short circuiting the heater coil 115 permitting cooling of the thermostat 13 with resultant opening of the valves 14 and 9 permitting a greater flow of fuel to the burners 2. The aforesaid cycle is repeated maintaining the predetermined room temperature. Should room temperature pass break temperature, then by counter-clockwise movement of the thermostat T4, the arm 98 engages the stationary contact 106 establishing a circuit from the upper side secondary of the transformer 12 through the thermostat T4, the stationary contact 106, the conductor 107, the stationary contact 108, the conductive element 110, the stationary contact 109, the conductor 112, the lower coil 102, and the conductor 100 back to the said secondary. However, since the coils 101, 102 (Fig. 8) are so wound as to buck each other for neutralization, such neutralization occurs and the valve 8 closes by gravity, stopping the flow of fuel to the burners 2.

It is manifest that in warm weather, as in summer, the arm 98 of the thermostat T4 is in contact with the stationary contact 106 establishing the circuit aforesaid. But the circuit of the heater coil 115 will not be closed since the valve 8 is in closed position and the contact strip 111 depressed by virtue thereof.

It is manifest from the foregoing descriptions of operation that in all forms of the invention, the circuit for the respective heating coil for the gas thermostat 13 is not energized in summer weather although no special setting and consequent care on the part of the user is required. In the systems shown in Figs. 4 and 7, specific means have been provided to prevent such energization and in the systems shown in Figs. 5 and 6, the respective arms of the thermostats are out of engagement with both contacts during warm weather.

It is to be particularly pointed out that the position of the gas thermostat 13 is immaterial as regards the present invention, and, hence, it may be disposed in the cold air return (Fig. 1), in the bonnet of the furnace (Fig. 3), or elsewhere as choice and circumstances dictate. In the systems shown in Figs. 4–7, a make and break thermostat is employed, and effective accurate modulation is obtained therewith as aforedescribed. However, a variable resistance thermostat of the nature of that shown in Fig. 9 may be employed.

Figures 2, 3:
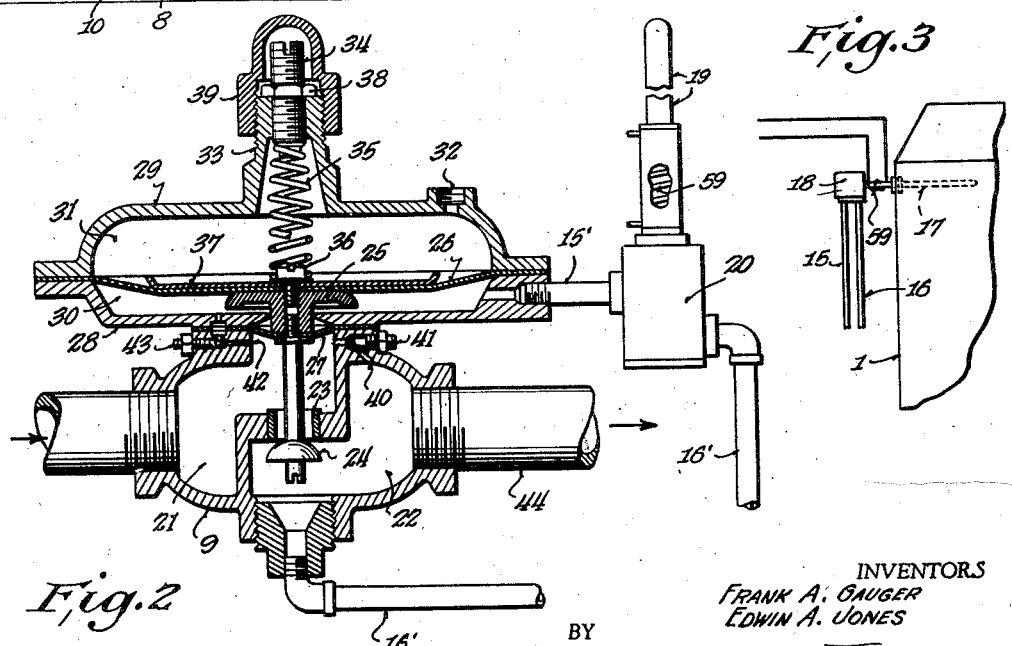
Fig. 2 is a sectional view through a pressure regulating and modulating valve showing a throttling thermostat carried by the modulating valve and forming therewith a unitary structure.
Fig. 3 is a fragmentary view showing a throttling thermostat positioned in the hood of a furnace.

The preferred form of pressure regulating and modulating valve is shown in Fig. 2, but other types may be employed, examples being disclosed in Figs. 10–12. The further detailed operation of these several valves shown in Figs. 10–12 is unnecessary since per se they form no part of the present invention. It is sufficient to state that the valve 120 of Figs. 10 and 11, or the valve of Fig. 12 would simply replace the valve 9 together with the gas thermostat 13 and its respective heater in the systems shown in Figs. 4–7.

It is to be understood that the foregoing description and the accompanying drawings have been given by way of illustration and example and not for purposes of limitation, the invention being limited only by the claims which follow.

We claim:

1. A heating system including an electrically actuated on and off valve, a modulating valve, said valves being in a fuel line to a burner, a thermostat disposed in a space to be heated, said thermostat including two contacts adapted to consecutively make and consecutively break, a thermostat and valve for controlling said modulating valve, a power source, an actuating electrical circuit through said two contacts, the power source and the electrical valve actuator for opening said electrical valve, a holding circuit through the first contact to make the power source and the electrical valve actuator operable when said second contact is open, means to complete the holding circuit actuated by opening of the electrical valve, a heating coil in the holding circuit disposed about the thermostat of the said thermostat and valve, and a heating coil in the actuating circuit disposed in adjacent relationship to the space thermostat, said latter coil having a fraction of the resistance of the former coil, said latter coil comprising an anticipating heater operated by closure of the second contact and being adapted to open the said second making contact of the space thermostat prematurely to prevent heat overrun and consequent opening of the first making contact to open the holding circuit.

2. In a mechanism of the kind described, a fuel flow control means operable to a maximum flow limit and to a minimum flow limit, a space thermostat operable to a cold position and a warm position, an anticipating heater for the thermostat energized only when the thermostat is in cold position, modulating means to effect operation of the fuel flow control means toward the maximum and minimum limits in accordance with the position of the space thermostat, said modulating means including the room thermostat in cold position and the anticipating heater for causing the fuel flow control means to operate toward its maximum limit.

3. A heating system comprising modulating fuel flow control means, including a thermostat operable from a cold position to a warm position, and located in the space to be heated, an anticipating heater for the thermostat operated when the thermostat is in cold position, a control for the modulating means including a heat-responsive device adapted to operate the modulating means toward flow-restricting position upon increase in heat thereat, a heater for the heat-responsive means, a first circuit including the heater of the heat-responsive means to effect restriction of flow, and a second circuit including the thermostat in cold position and the anticipating heater adapted to at least reduce energization of the heater of the heat-responsive means to cause the fuel flow control means to effect increase of flow.

4. In a heating system, a fuel supply modulating means, electrical power means to operate the modulating means, said electrical means being adapted to operate the modulating means to restrict fuel flow upon increase of power applied thereto, and to effect operation of the modulating means to increase fuel flow upon reduction of power applied thereto, a thermostat movable from a cold to a warm position, an anticipating heater for the thermostat energized when the thermostat is in cold position and at least substantially ineffective when the thermostat is in warm position, a first circuit through the electric power means to supply predetermined power thereto to effect reduction of fuel flow, a second circuit closed by operation of the thermostat to cold position, and including the anticipating heater, said second circuit being in parallel with the first circuit and by said parallelism acting to shunt the first circuit at least partially, whereby to reduce the power supplied to the electrical power means and effect increase of fuel flow.

5. In a heating system, a fuel supply modulating means, including a heat-responsive element adapted to effect decrease of fuel flow upon application of heat thereto and increase of fuel flow upon reduction of heat applied thereto, an electrical heater in heat-transfer relation to the heat-responsive element, a space thermostat movable from a cold to a warm position, an anticipating heater for the thermostat energized when the thermostat is in cold position and at least substantially ineffective when the thermostat is in warm position, a first circuit through the electrical heater to supply predetermined power thereto to effect reduction of fuel flow, a second circuit closed by operation of the thermostat to cold position, and including the anticipating heater, said second circuit being in parallel with the first circuit and by said parallelism acting to shunt the first circuit at least partially whereby to reduce the power supplied to the electrical heater and effect increase of fuel flow.

FRANK A. GAUGER.
EDWIN A. JONES.